UNITED STATES PATENT OFFICE.

HIRAM D. LINGLE, OF LINGLE, WYOMING, ASSIGNOR OF ONE-HALF TO STEPHEN O. SHARP, OF INDIANAPOLIS, INDIANA.

SEED AND PROCESS OF PREPARING SAME FOR PLANTING.

1,319,157. Specification of Letters Patent. Patented Oct. 21, 1919.

No Drawing. Application filed July 21, 1917, Serial No. 181,983. Renewed March 14, 1919. Serial No. 282,747.

*To all whom it may concern:*

Be it known that I, HIRAM D. LINGLE, a citizen of the United States, residing at Lingle, Goshen county, and State of Wyoming, have invented and discovered certain new and useful Improvements in Seeds and Processes of Preparing Same for Planting, of which the following is a specification.

My invention relates to seeds and processes of preparing the same for planting.

The objects of the invention are to impart such weight and uniformity of size to the seeds that the distribution of the same in planting may be effectively controlled, obviating the dispersion of the seeds by the wind, enabling the same to be planted by a cornplanter or similar machine and making it possible to plant seeds of light weight in conveniently separated hills and in definite numbers, with the results of saving seed, permitting cross cultivation of the plants and obviating the necessity of thinning; and also, in conjunction with these results providing for a more effective application of fertilizer than under present practices.

With these objects in view my invention consists, broadly stated, in coating the seeds before planting with an adhesive substance capable of drying thereon, and adapted to give such additional body to the seeds as to impart sufficient weight and size thereto as to prevent their dispersion by the wind during planting, and enable them to be distributed by a corn planter or similar seed planting machine, this body being formed of a moisture absorbing, non-deleterious, readily disintegrable substance, and which may also be composed of or include in its composition a suitable fertilizing medium.

The invention has particular application to sugar beet seeds although capable of use with other seeds.

Sugar beet seeds are very light. They must be planted close to the surface of the soil. They are therefore easily blown away by the wind. In consequence of these conditions they must be planted by drills in continuous rows, and in excessive quantities in order to insure a sufficient growth. This planting in continuous rows or drills is exceedingly laborious and costly. After the plants have developed they must then be blocked into separate hills which are necessarily irregular in arrangement and then thinned, which irregular arrangement prevents cross cultivation. This work is now done by hand and is extremely costly and unsatisfactory. In the planting of beet seeds coated according to my invention, the seeds may be fed from an ordinary corn planter, and deposited only at regular intervals in hills, one or more seeds in a place, as desired. This mode of planting effects a very great saving of seed. After the plants have developed, they may be cross cultivated by machinery as in the cultivation of corn, avoiding the labor of hand cultivation and thinning.

In carrying out the invention, the substance employed for the coating, when no fertilizing medium is to be employed, consists preferably of starch which is applied to the seeds in a fluid condition and permitted to dry thereon. The application may be carried out by any suitable coating methods such as feeding the seeds along inclined tables carrying the starch or preferably by depositing the seeds in rotating pans, moistening the seeds with syrup and then dusting the starch on the moistened seeds with the result of adherence of the starch thereto. These steps of moistening and powdering the seeds are repeated successively until a sufficient accumulation of the adhesive material thereon is obtained to give to each seed a body which will entirely cover the rough surface of the seeds and add sufficient weight and size thereto to enable the seed to be readily handled and distributed by an intermittently feeding device adapted to feed the seeds in definitely controlled quantities and in which the completed covered seeds are of substantially uniform size and possess a smooth surface which serves to facilitate the feeding action. The starch used is of such quality that it will absorb moisture readily, and quickly disintegrate under the action thereof so that when the coated seeds are placed in the ground the coating will take up moisture therefrom and break up and separate from the seeds, thus permitting their germination.

In the formation of the exterior weight giving body upon beet seeds, the proportions employed are from four to six times by weight of the amount of the starch or starch mixed with the fertilizing material to the seeds. Thus it has been found, in practice, that a desirable proportion for use in connection with sugar beet seeds is a mixture of the starch with fertilizing material amounting to three pounds and one ounce to nine ounces of the seeds. With seeds thus coated the covering body is substantially one-sixteenth of an inch in thickness and completely incloses the seed and produces a smooth symmetrical product which is from 5 to seven times as heavy as the uncoated seed.

Other compositions possessing the characteristic of disintegration, under the action of the moisture in the soil, may be used to form the coating.

Although sugar beet seeds thus coated constitute the most valuable embodiment of my invention, as far as now known, yet the process is capable of application to other seeds to increase their weight and render them regular and uniform in shape and size, and for which it may be desirable to substitute the above method of planting in controlled quantities of definite number for drilling in continuous rows.

The invention also contemplates the use of a fertilizing agent as the coating substance or as part of the composition. For this purpose a composition of starch, ammonia, potash, phosphorus, and slaked lime applied to the moistened seeds as before described has been found suitable. A desirable mixture to be applied to nine ounces of sugar beet seeds has been found to be one consisting of slaked lime one ounce, "red star" fertilizer (ammonia, potash and phosphorus) one ounce, and powered starch three pounds one ounce. The starch serves as a non-deleterious adhesive and body giving substance and produces a dry hard covering or shell. Other fertilizer or fertilizer-carrying compositions capable of disintegration under the effect of soil moisture, however, may be employed.

Seeds thus coated may be prepared at a suitable plant and kept indefinitely and shipped to the farmer for use.

The application of the fertilizer directly to the seeds will produce a more effective stimulating and feeding action, as well as be more economical, than the ordinary process of applying the fertilizer to the soil.

Having thus described my invention, what I claim is:—

1. Seeds prepared for planting having a hard, built up body of adhesive material and solid material on the exterior surface of the seeds and of sufficient mass to add substantial weight thereto.

2. Seeds of a weight and size not adapted for plating by machinery singly, having a dry, hard relatively thick shell of material adhered thereto, said shell providing a smooth surface for the seeds and of sufficient mass to add weight and size thereto necessary for planting by machine in controlled numbers and at definite intervals without dispersion.

3. Seeds prepared for planting having a dry, fertilizing coating which adds substantially to the weight and size of said seeds.

4. Seeds having a hard, dry built up coating of adhesive material and moisture absorbent, disintegrable material, non-deleterious to the seed.

5. Sugar beet seeds having a hard, dry, smooth covering of adhesive, moisture absorbent, disintegrable material, non-deleterious to the seeds and of sufficient thickness to increase substantially the weight and size of said seeds.

6. Seeds coated with starch dried thereon and of sufficient thickness to add appreciable weight and size to the seeds.

7. Seeds having a dry coating of a composition comprising starch and fertilizing material.

8. The process of preparing seeds for planting which consists in applying to the surface thereof an adhesive, then applying a layer of solid material and then successively adhesive material and solid material until a coating has been built up on the seeds sufficient to overcome irregularities in outline thereof and to add sufficient weight to the seed where the same are too light to be planted by the present form of machinery to enable them to be dropped by machine in controlled numbers.

In witness whereof, I have hereunto set my hand and seal at Stone Lake, Wisconsin, this 17th day of July, A. D. nineteen hundred and seventeen.

HIRAM D. LINGLE. [L. S.]

Witnesses:
GEO. H. STUBBINS,
J. M. STUDEBAKER.